US009917786B2

(12) United States Patent
Zhu et al.

(10) Patent No.: US 9,917,786 B2
(45) Date of Patent: Mar. 13, 2018

(54) SYSTEMS, METHODS, AND DEVICES TO SUPPORT INTRA-APPLICATION FLOW PRIORITIZATION

(71) Applicant: INTEL CORPORATION, Santa Clara, CA (US)

(72) Inventors: Jing Zhu, Portland, OR (US); Yi Gai, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 160 days.

(21) Appl. No.: 14/316,919

(22) Filed: Jun. 27, 2014

(65) Prior Publication Data

US 2015/0381502 A1 Dec. 31, 2015

(51) Int. Cl.
*H04L 12/851* (2013.01)
*H04L 12/805* (2013.01)
(Continued)

(52) U.S. Cl.
CPC .......... *H04L 47/36* (2013.01); *H04L 47/2441* (2013.01); *H04W 28/0205* (2013.01); *H04W 72/04* (2013.01); *H04W 72/042* (2013.01); *H04W 72/08* (2013.01); *H04W 72/1242* (2013.01); *H04L 41/0893* (2013.01); *H04L 43/026* (2013.01); *H04L 47/32* (2013.01); *H04W 28/0247* (2013.01); *H04W 28/0268* (2013.01);
(Continued)

(58) Field of Classification Search
CPC .......... H04L 47/24; H04L 47/36; H04W 28/10
USPC ........................................................ 370/236
See application file for complete search history.

(56) References Cited

U.S. PATENT DOCUMENTS

2005/0243835 A1* 11/2005 Sharma ............... H04L 12/2874
370/395.42
2008/0288663 A1* 11/2008 Kovacevic ........... H04N 21/434
710/5
(Continued)

FOREIGN PATENT DOCUMENTS

WO WO 20120928888 * 7/2012

OTHER PUBLICATIONS

Cisco Systems, Inc., "Optimizing Enterprise Video Over Wireless LAN", White Paper C11-577721-00, 2010, 11 pages.
(Continued)

*Primary Examiner* — Jae Y Lee
*Assistant Examiner* — Jean F Voltaire
(74) *Attorney, Agent, or Firm* — Stoel Rives LLP

(57) ABSTRACT

Systems and methods to support intra-application flow prioritization are disclosed herein. User equipment (UE) may be configured to communicatively couple to an Evolved Universal Terrestrial Radio Access Network (E-UTRAN) Node B (eNB). The eNB may transmit packets from the UE to an evolved packet core (EPC), which may transmit schedule packets to an application function (AF) via a network. The AF may provide classification information and prioritization information for a plurality of intra-application flows transmitted between the AF and the UE. The EPC may classify uplink and/or downlink traffic into the intra-application flows and mark and/or schedule the traffic based on the prioritization information. Absolute and/or modular length, payload values, and/or packet type may be used to classify the traffic into the intra-application flows.

23 Claims, 7 Drawing Sheets

(51) Int. Cl.
*H04W 72/04* (2009.01)
*H04W 72/12* (2009.01)
*H04W 28/02* (2009.01)
*H04W 72/08* (2009.01)
*H04L 12/26* (2006.01)
*H04W 88/06* (2009.01)
*H04L 12/24* (2006.01)
*H04L 12/823* (2013.01)

(52) U.S. Cl.
CPC ...... *H04W 28/0273* (2013.01); *H04W 72/087* (2013.01); *H04W 88/06* (2013.01)

(56) References Cited

U.S. PATENT DOCUMENTS

| | | | | |
|---|---|---|---|---|
| 2008/0310451 | A1* | 12/2008 | Kang | H04N 21/235 370/474 |
| 2012/0016995 | A1 | 1/2012 | You | |
| 2013/0279335 | A1* | 10/2013 | Ahmadi | H04W 28/0205 370/235 |
| 2014/0241333 | A1* | 8/2014 | Kim | H04W 48/16 370/338 |
| 2014/0328288 | A1* | 11/2014 | Lu | H04W 28/0268 370/329 |
| 2014/0376360 | A1* | 12/2014 | Lisak | H04W 76/00 370/218 |

OTHER PUBLICATIONS

PCT/US2015/032852, International Search Report and Written Opinion, dated Sep. 8, 2015, 13 pages.

LG Electronics, "Consideration on starvation problem of RAN-based solution", S2-134195, SA WG2 Meeting S2#100, San Francisco, USA, Agenda Item 6.6.2, Nov. 11-15, 2013, 6 pages.

* cited by examiner

SYSTEMS, METHODS, AND DEVICES TO SUPPORT INTRA-APPLICATION FLOW PRIORITIZATION

TECHNICAL FIELD

The present disclosure relates to flow prioritization of intra-application flows between an application and User Equipment (UE).

DETAILED DESCRIPTION OF PREFERRED EMBODIMENTS

Figure 1:
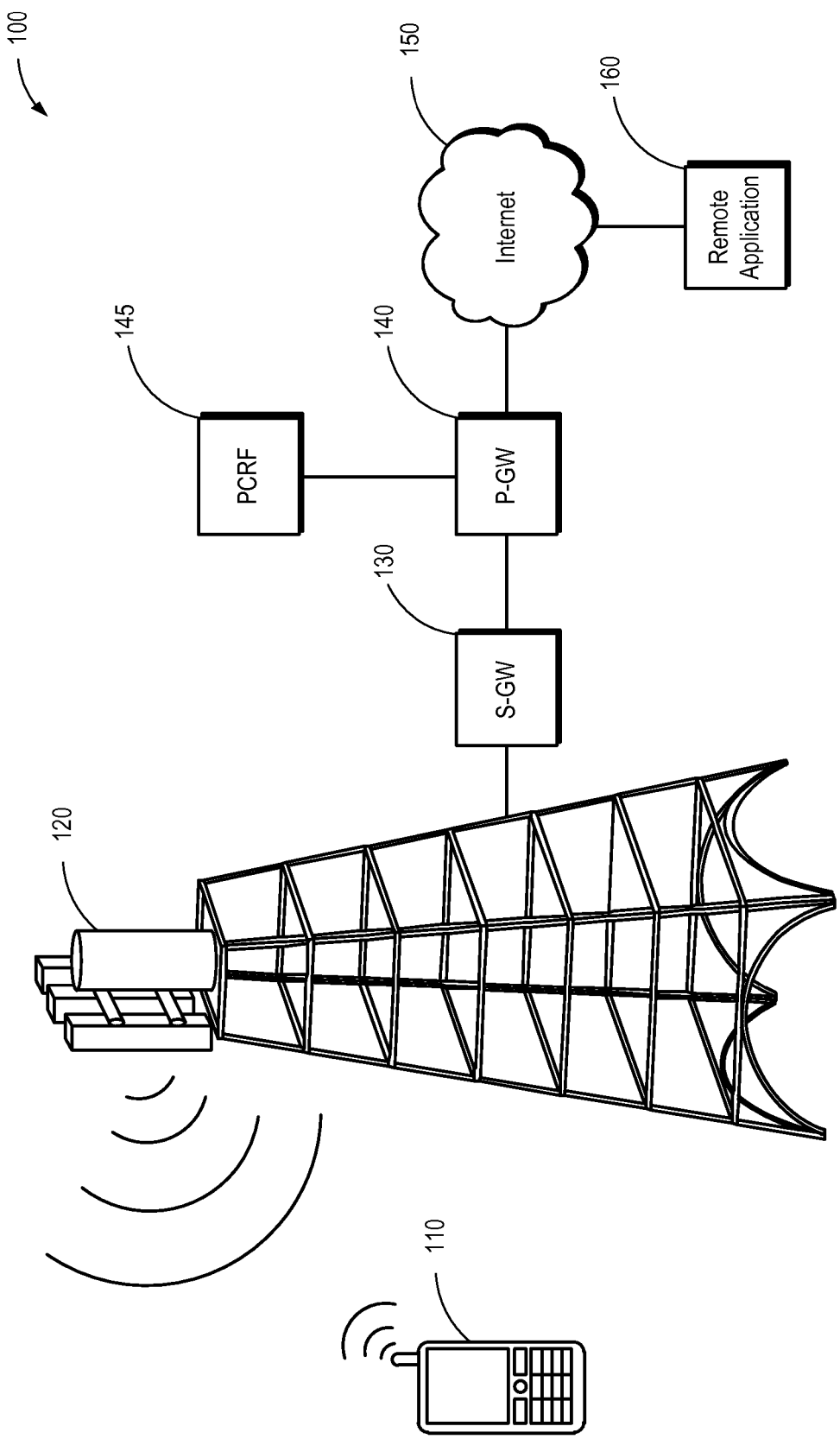
FIG. 1 is a schematic diagram of a system for communicatively coupling a UE to a remote application via the Internet.

Wireless mobile communication technology uses various standards and protocols to transmit data between a base station and a wireless communication device. Wireless communication system standards and protocols can include, for example, the 3rd Generation Partnership Project (3GPP) long term evolution (LTE); the Institute of Electrical and Electronics Engineers (IEEE) 802.16 standard, which is commonly known to industry groups as worldwide interoperability for microwave access (WiMAX); and the IEEE 802.11 standard, which is commonly known to industry groups as Wi-Fi. In 3GPP radio access networks (RANs) in LTE systems, a base station may include Evolved Universal Terrestrial Radio Access Network (E-UTRAN) Node Bs (also commonly denoted as evolved Node Bs, enhanced Node Bs, eNodeBs, or eNBs) and/or Radio Network Controllers (RNCs) in an E-UTRAN, which communicate with a wireless communication device, known as user equipment (UE). In LTE networks, an E-UTRAN may include a plurality of eNodeBs and may communicate with a plurality of UEs. An evolved packet core (EPC) may communicatively couple the E-UTRAN to an external network, such as the Internet.

LTE networks include radio access technology and core radio network architecture that provide high data rate, low latency, packet optimization, and improved system capacity and coverage. The EPC may be responsible for transporting packets between the external network and the E-UTRAN while meeting service requirements. A downlink (DL) transmission may be defined as a communication received by the EPC from a remote application for delivery to a UE, and an uplink (UL) transmission may be defined as a communication received by the EPC from the UE for delivery to the remote application. The EPC may ensure that UL packets are properly routed to the external network and that DL packets are properly routed to the UE in accordance with any service requirements.

When a UE communicatively couples with an E-UTRAN, an evolved packet system (EPS) bearer may be established for the UE. The EPS bearer may be a virtual coupling between the UE and a packet data network (PDN) gateway (P-GW) within the EPC and may be comprised of additional bearers (e.g., an E-UTRAN radio access bearer (E-RAB), a radio bearer, an S1 bearer, an S5/S8 bearer, etc.). The EPS bearer may include a guaranteed quality of service (QoS). For example, each EPS bearer may be associated with a QoS class identifier (QCI), and each QCI may be associated with predefined QoS parameters. The QCI QoS parameters may include priority, packet delay budget, packet error/loss rate, resource type, whether a bit rate is guaranteed, and/or the like. Data packets from different EPS bearers may be treated differently by the EPC based on the QCI associated with each EPS bearer.

Within bearers, the relative priority of packets may be determined from flow priority indicators (FPI). The flow priority indicator may be a number, such as an unsigned integer, that indicates the relative priority of each flow of packets relative to other flows. The EPC may determine with which flow each packet is associated. The EPC may schedule packets based on the FPI of the flow with which the packets are associated. Packets associated with higher priority flows may be prioritized at the expense of packets associated with lower priority flows. Packets associated with lower priority flows may be dropped, and sources transmitting lower priority flows may adjust their transmission bandwidth based on the dropped packets and/or the scheduling treatment received. In an embodiment, the P-GW and/or a traffic detection function (TDF) may identify, mark, and/or schedule flows.

An application function may transmit an application flow that is scheduled by the EPC. The application function may transmit several intra-application flows that are included in the same application flow. One or more of the intra-applications flow may be more important to the application function than other of the intra-application flows. For example, a video calling service may be associated with an application flow that contains an audio packet flow and a video packet flow. The audio packets may be more important to the video calling service than the video packets. The video calling service may prefer to have additional video packets dropped to protect audio packets so that audio remains clear even if video is degraded or lost. Thus, the application function may be able to provide a better quality of experience (QoE) if packets within a same application flow are prioritized based on which intra-application flow the packets are associated with.

In an embodiment, the application function may provide classification information and intra-application FPIs to the EPC for the intra-application flows. The EPC may classify received packets as belonging to one of the intra-application flows and schedule the packets based on a corresponding intra-application FPI. For example, the P-GW and/or the TDF may identify with which intra-application flow each packet is associated. The P-GW and/or TDF may mark and/or schedule each packet based on the intra-application FPI for the flow with which the packet is associated. Other elements of the EPC (e.g., a serving gateway (S-GW), etc.) and/or the E-UTRAN may prioritize packets based on the marked intra-application FPI.

The application function may provide the classification information and requested intra-application FPIs to a policy and charging rules function (PCRF) via an Rx interface. A media-sub-component attribute-value-pair (AVP) may be modified to include an enhanced flow description for classifying packets and a requested FPI. The requested FPI and enhanced flow description AVPs may be sent to the PCRF by the application function in an AA-request. The PCRF may determine a granted FPI based on the requested FPI. The granted FPI may also be determined based on policies of an EPC operator and/or based on information obtained through packet inspection (e.g., shallow packet inspection, level seven deep packet inspection, heuristic analysis, etc.) performed by the P-GW and/or TDF. A flow-information AVP may be modified to include the granted FPI and enhanced flow description. The granted FPI and enhanced flow description AVPs may be sent in a CC-request from the PCRF to the P-GW over a Gx interface and/or to the TDF over an Sd interface. For example, the CC-request may be sent a policy and charging enforcement function (PCEF) at the P-GW.

The P-GW and/or TDF may identify packets based on the enhanced flow description. In an embodiment or configuration, the enhanced flow description may indicate a length of packets belonging to a particular flow. The length may be specified as a range between a minimum length and a maximum length, may be specified by a modulo operation, and/or the like. For example, the enhanced flow description may include an indication of packet type (e.g., IP, UDP, TCP, etc.), an indication of method type (e.g., min-max range, modulo operation, etc.), and classification parameters (e.g., a minimum length and maximum length, a modulus and a remainder, etc.). In another embodiment or configuration, the enhanced flow description may indicate a value of a payload of packets belonging to a particular flow. The enhanced flow description may indicate values for various fields in the packets. In an embodiment, the enhanced flow description may include an indication of packet type (e.g., IP, UDP, TCP, etc.), an indication of the number of bit fields (e.g., how many fields should be compared), and for each field, an offset of the field from the beginning of the packet and/or payload, a length of the field, and a value for the field. The application function may specify a plurality of enhanced flow description corresponding to a plurality of intra-application flows.

The identified packets may be marked and/or scheduled based on the granted FPI. Packets may be marked by the TDF and/or P-GW. Scheduling may performed by the TDF, P-GW, S-GW, E-UTRAN, and/or the like. The granted FPI may be a number (e.g., an unsigned integer) that indicates the relative priority of the intra-application flow relative to other intra-application flows. Packets associated with flows having higher priority FPIs may be prioritized (e.g., given more bandwidth, less latency, a lower loss rate, and/or the like) at the expense of packets associated with flows having lower priority FPIs. For example, lower priority packets may be delayed or dropped to so that higher priority packet can arrive sooner and/or avoid being dropped. Packets for which a flow cannot be identified may be marked and/or scheduled based on a default intra-application FPI. The default FPI may be requested by the application function and/or determined by the PCRF.

Filtering of packets based on intra-application FPI may be performed on downlink packets only, on uplink packets only, or on both downlink and uplink packets. Uplink packets may identified and/or marked at the UE and/or E-UTRAN. Downlink packets may be identified and marked at the P-GW and/or TDF. In some embodiments, an application function on a remote server may transmit the enhanced flow description and/or requested FPI to the PCRF. The application function may know in advance the characteristics of packets that are going to be sent to and/or from the UE. In an embodiment, the UE may send the enhanced flow description and/or request FPI to the PCRF for uplink and/or downlink intra-application flows. The filtering and/or scheduling performed may be operator specific but may ensure that no flows are completely starved.

FIG. 1 is a schematic diagram of a system 100 for communicatively coupling a UE 110 to a remote application 160 via the Internet 150. An eNB 120 may be wirelessly communicatively coupled with the UE 110, which may allow mobile use of the UE 110 by a user while still remaining communicatively coupled to the remote application 160. The eNB 120 may be communicatively coupled to a switching gateway (S-GW) 130, which may be communicatively coupled to a P-GW 140. The P-GW 140 may be communicatively coupled to the Internet 150. The P-GW 140 may be responsible for routing packets from the UE 110 to the remote application 160 and for routing packets from the remote application 160 the proper S-GW 130 for delivery to the UE 110. The S-GW 130 may be responsible for routing packets from the P-GW 140 to the eNB 120 for delivery to the UE 110 and vice-versa. An EPS bearer (not shown) may be established between the UE 110 and the P-GW 140. The EPS bearer may guarantee a certain QoS for packets carried between the UE 110 and the P-GW 140 based on an associated QCI. Application FPIs and intra-application FPIs may be associated with flows in the EPS bearer. A PCRF 145 may be responsible for tracking and/or determining how packets and flows should be classified and scheduled (e.g., based on the QCI, application FPI, intra-application FPI, and/or the like). The P-GW 140 may include a PCEF (not shown), which may actually perform the classification and scheduling based on instructions from the PCRF 145. The S-GW 130, P-GW 140, and PCRF 145 may be referred to as the EPC. The EPC may include additional components not shown.

The UE 110 may be a smart phone, a tablet, a modem coupled to a laptop or personal computer, and/or the like. Various applications, such as computer programs, mobile applications, and/or the like, may be executed on the UE 110. The various applications on the UE 110 may communicate with remote applications 160 via the, eNB 120, S-GW 130, P-GW 140, and/or Internet 150. The various applications may be assigned to one or more EPS bearers, and each application flow may be assigned an FPI. The remote application 160 may further request that intra-application flows each be assigned an intra-application FPI. The EPC may prioritize packets based on the QCI of the EPS bearer, the application FPI, and/or the intra-application FPI. For example, the UE 110, eNB 120, S-GW 130, and/or P-GW 140 may schedule packets based on the intra-application FPIs with which the packets are associated.

Figure 2:
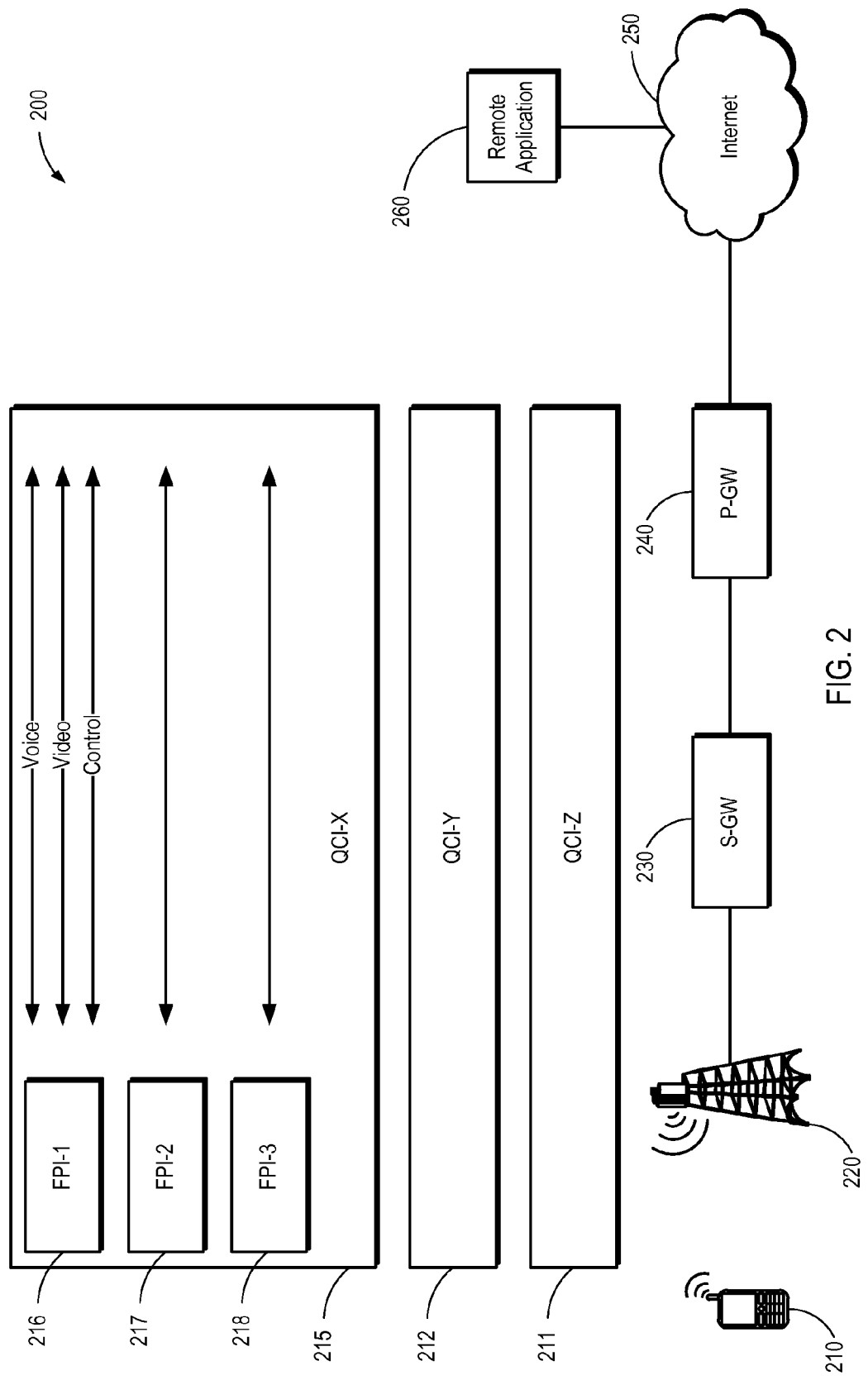
FIG. 2 is a schematic diagram of a system for communicatively coupling a UE to the Internet using a plurality of bearers.

FIG. 2 is a schematic diagram of a system 200 for communicatively coupling a UE 210 to the Internet 250 using a plurality of bearers 211, 212, 215. The plurality of bearers 211, 212, 215 may be established between the UE 210 and the P-GW 240 and may include default and dedicated bearers. Each bearer may be associated with a QCI. The UE 210 may request that a default bearer 215 be established for transporting packets of non-privileged subscribers. The default bearer for non-privileged subscribers 215 may include a plurality of flows 216, 217, 218. Each flow 216, 217, 218 may be associated with an application operating on the UE 210 and may be assigned an application FPI. The UE 210, eNodeB 220, S-GW 230, and/or P-GW

240 may schedule uplink and/or downlink packets based on the QCI of the associated bearer 211, 212, 215 and/or the FPI of the associated flow 216, 217, 218.

Packets in a first flow 216 may be communicated between the UE 210 and a remote application 260. The first flow 216 may include a plurality of intra-application flows, such as flows for voice, video, control, and/or the like. The intra-application flows may be assigned intra-application FPIs based on requests from the remote application 260. The intra-application FPIs may define the relative treatment the intra-application flows should receive. The intra-application FPIs may indicate the relative importance of the flows to the remote application 260. Without intra-application FPIs and/or if intra-application scheduling is not enabled, the packets within a flow may receive equal treatment and be dropped in equal proportions. The intra-application FPIs may allow packets in less important flows to be delayed or dropped so packets in more important flows can avoid being delayed or dropped. The UE 210, eNodeB 220, S-GW 230, and/or P-GW 240 may ensure all QoS parameters of each bearer are met before scheduling based on application FPIs and may schedule based on application FPIs before considering intra-application FPIs. The intra-application FPIs may not affect the scheduling of packets in other bearers and/or application flows. Any improvement in performance of one intra-application flow may come at the expense of the performance of another intra-application flow.

Figure 3:
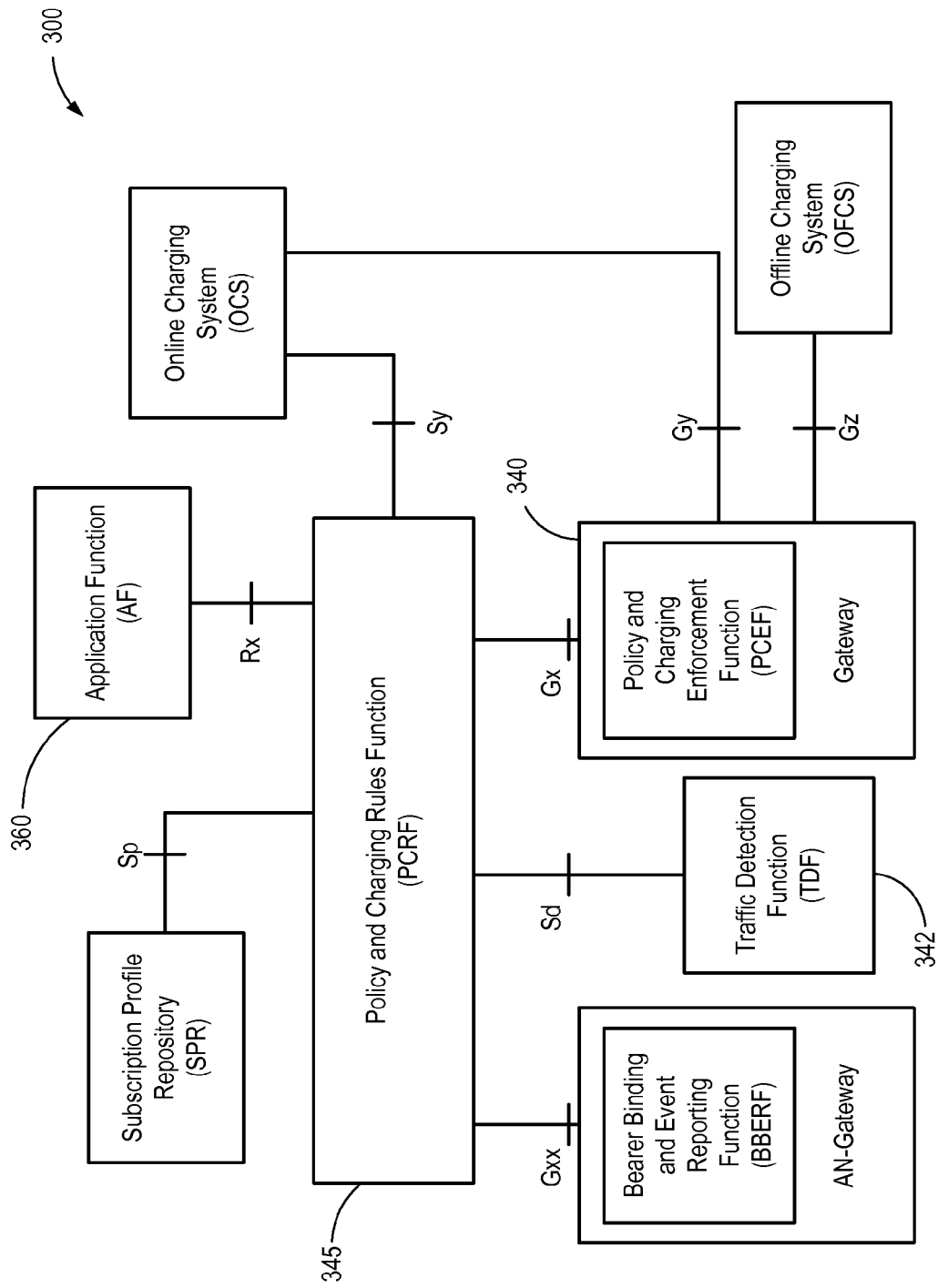
FIG. 3 is a schematic diagram of a portion of an EPC able to schedule packets based on intra-application FPI.

FIG. 3 is a schematic diagram of a portion of an EPC 300 able to schedule packets based on intra-application FPI. The EPC 300 may include a PCRF 345. An application function 360 may be communicatively coupled with the PCRF 345 via an Rx interface. The application function 360 may send classification information to the PCRF 345 for identifying a plurality of intra-application flows within the application flow from the application function 360. The classification information may include enhanced flow descriptions for each intra-application flow. The enhanced flow description may identify packets at least in part based on a type of the packet (e.g., whether the type is, inter alia, IP, UDP, and/or TCP). The enhanced flow descriptions may identify a particular intra-application flow based on a length of packets within that flow. The enhanced flow description may specify a range between a minimum and a maximum in which each packet will fall. Alternatively, the enhanced flow description may specify the length according to a module operation. For example, the application function 360 may know that packets will include a plurality of block of a certain size but may not know how many blocks will be included in each packet. The packets may all have the same remainder for a particular modulus regardless of how many blocks are included.

The enhanced flow description may identify the packets in the intra-application flow based on the values of one or more fields in the packets. The fields may be analyzed conjunctively and/or disjunctively. The fields may be specified based on an offset from a beginning of the packet and/or packet payload, a length of the field, and/or one or more values of the field. If a sufficient number of fields in a packet match the specified values, the packet may classified as belonging to that intra-application flow. The application function 360 may also transmit a requested FPI for each intra-application flow to the PCRF 345. The PCRF 345 a granted FPI for each intra-application flow based on the requested FPI. The PCRF 345 may also, or instead, determine the granted FPI based on packet inspection by a TDF 342 and/or a P-GW 340. The packet inspection may include shallow inspection, deep packet inspection, heuristic analysis, and/or the like. The PCRF 345 may decide to grant an FPI different from what was requested. The requested and/or granted FPI may be specified as a number that indicates priority based on whether it is larger or smaller than other requested and/or granted FPIs. Higher priority may be given to ascending or descending numbers.

The PCRF 345 may be communicatively coupled to the TDF 342 by an Sd interface and/or to the P-GW 340 containing a PCEF by a Gx interface. Some embodiments may include a TDF 342 and a P-GW 340, and other embodiments may include only a P-GW 340. The PCRF 345 may transmit the enhanced flow description, the granted FPI, and/or the requested FPI to the TDF 342 and/or the P-GW 340. The TDF 342 and/or P-GW 340 may classify packets into intra-application flows based on the enhanced flow description. The TDF 342 and/or P-GW 340 may inspect packets to evaluate whether they match definitions in the enhanced flow description. Based on the intra-application flow associated with a packet, the TDF 342 and/or P-GW 340 may mark and/or schedule the packet according to the requested and/or granted FPI associated for that intra-application flow. For example, the TDF 342 and/or P-GW 340 may delay or drop low priority packets to improve the performance of high-priority packets.

Figure 4:
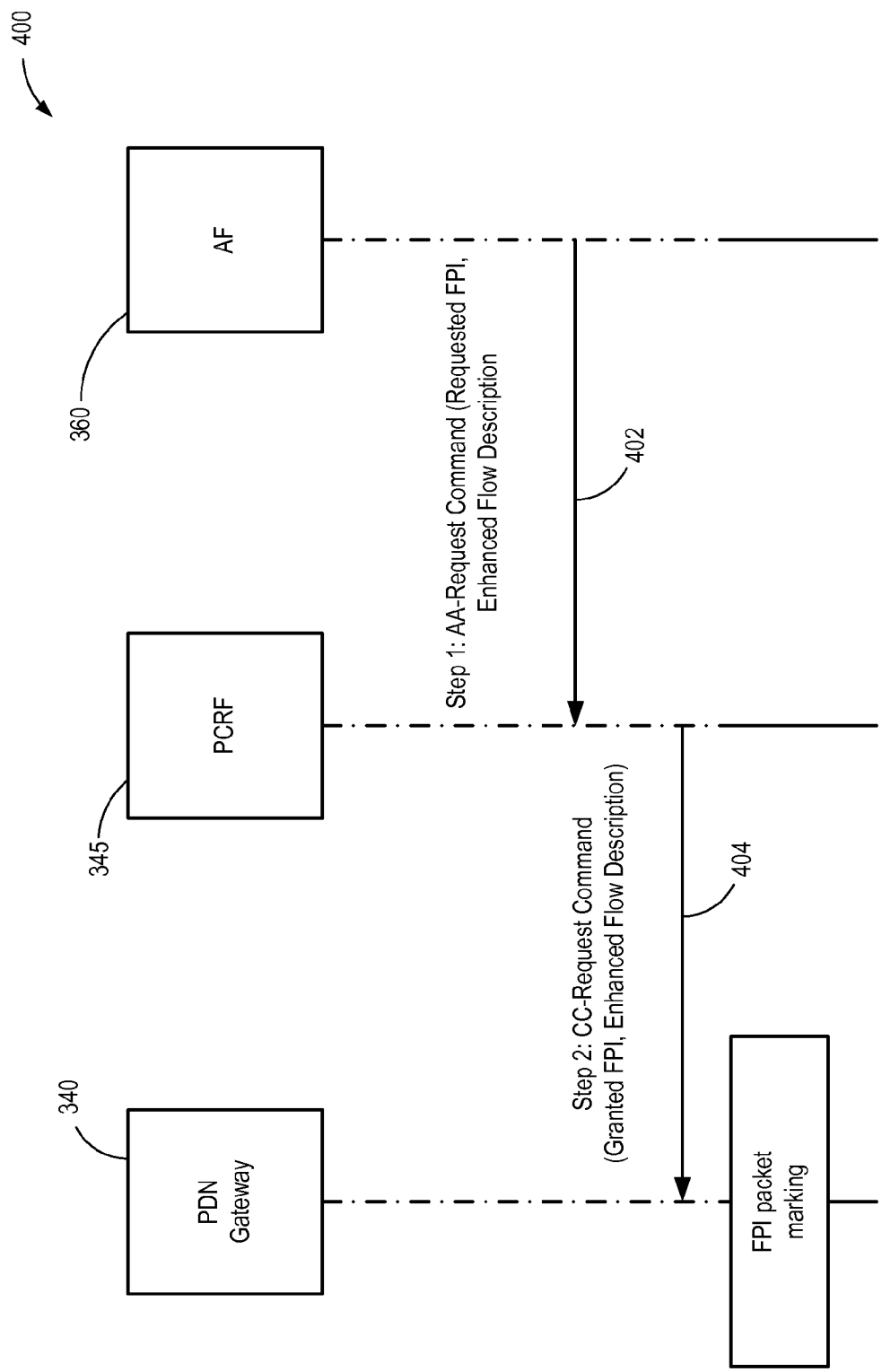
FIG. 4 is a schematic diagram of a plurality of communications between the application function, the PCRF, and the P-GW.

FIG. 4 is a schematic diagram of a plurality of communications 400 between the application function 360, the PCRF 345, and the P-GW 340. The application function 360 may transmit the requested FPI and the enhanced flow description to the PCRF 345 over the Rx interface using an AA-request 402. The AA-request 402 may include the requested FPI and the enhanced flow description as AVPs. The requested FPI and the enhanced flow description may be added as additional AVPs to a previously defined media-sub-component AVP. For example, the requested FPI and the enhanced flow description may be appended to the end of the media-sub-component AVP.

The PCRF 345 may determine a granted FPI from the requested FPI as previously discussed. The PCRF 345 may then transmit the granted FPI and the enhanced flow description to the P-GW 340 (and/or the TDF 342) over the Gx interface using a CC-Request 404. The CC-request 404 may include the requested and/or granted FPI and enhanced flow description as AVPs. The requested and/or granted FPI and the enhanced flow description may be added as additional AVPs to a previously defined flow-information AVP. For example, the requested and/or granted FPI and the enhanced flow description may be appended to the end of the flow-information AVP. The P-GW 340 may classify, mark, and/or schedule packets based on the enhanced flow description and the received FPI. The particular scheduling algorithm used by the P-GW 340 may not need to be specified by the application function 360. For example, the PCRF 345 and/or the P-GW 340 may select which scheduling algorithm to implement. Alternatively, or in addition, the application function 360 may be able to indicate the scheduling algorithm.

Figure 5:
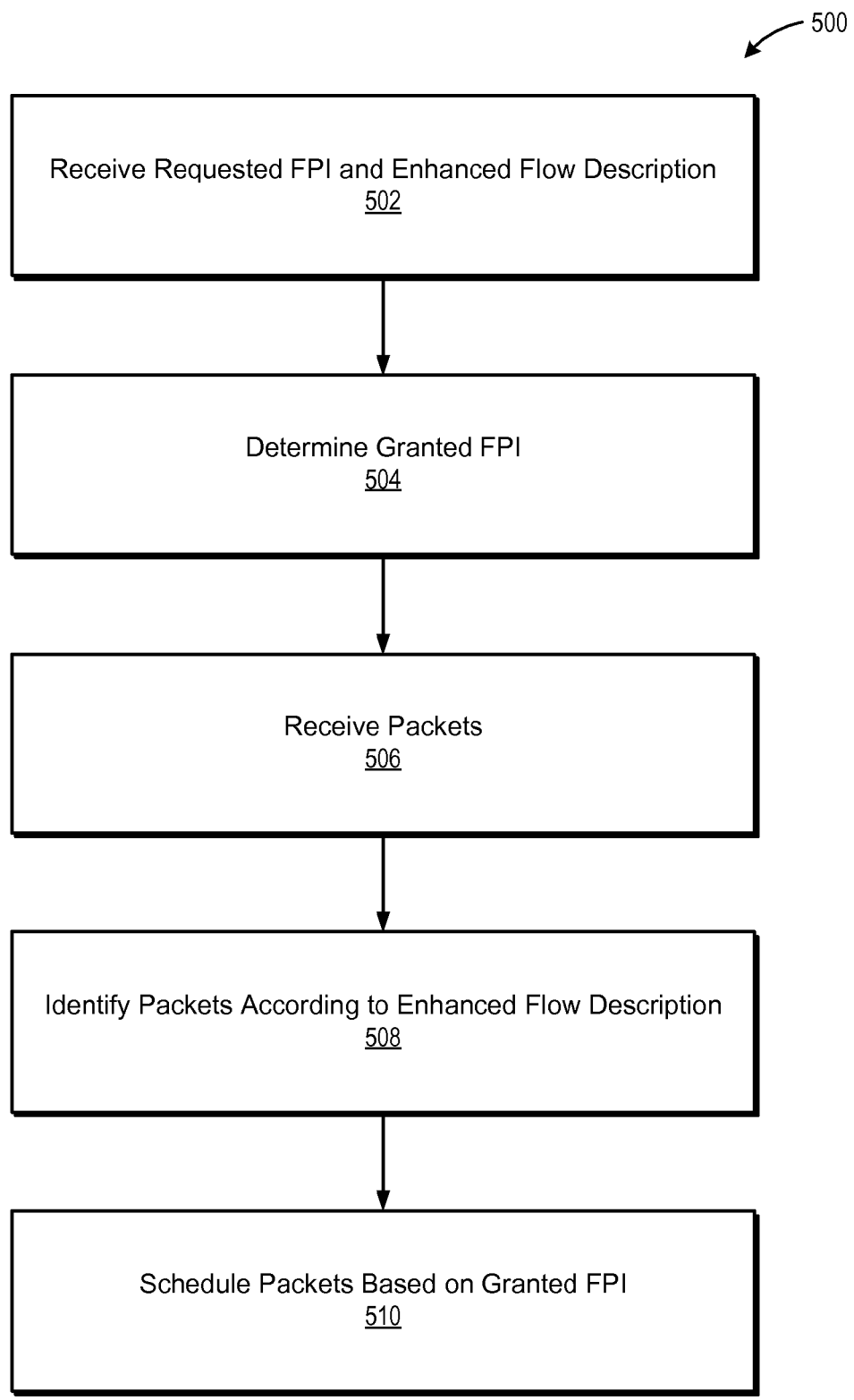
FIG. 5 is a flow diagram of a method for establishing scheduling for an intra-application flow.

FIG. 5 is a flow diagram of a method 500 for establishing scheduling for an intra-application flow. The method 500 may begin when a requested FPI and/or an enhanced flow description are received 502. The requested FPI and/or the enhanced flow description may be received from an application function operating on a remote server and/or from an application running on a UE. The requested FPI and the enhanced flow description may be received as an AA-request over an Rx interface. The requested FPI may be specified as a number that indicates the relative priority compared to other intra-application flows. The enhanced flow description may indicate a packet type, a packet length, and/or the value of a packet payload. The packet length may be specified as a range between an absolute minimum and an absolute maximum or as a remainder for a particular modulus. The value of the payload may be specified for one or more bit fields in the packet. The position, length, and value of each bit field may be specified.

A granted FPI may be determined 504 from the requested FPI. The granted FPI may be selected to be the same as the requested FPI and/or may be different that the requested FPI. The granted FPI may be determined based on packet inspection of packets associated with the intra-application flow. Shallow inspection, level seven deep packet inspection, heuristic analysis, and/or the like may be used to inspect the packets. It may be determined that the requested FPIs will give a low QoE to the user, so granted FPIs that will give a better QoE may be determined instead.

Packets associated with the intra-application flow may be received 506 from the application function and/or the UE. The packets may be identified 508 according to the enhanced flow description. The packet type, absolute and/or modular length, value of one or more bit fields, and/or the like may be compared to the enhanced flow description. Any conjunctive and/or disjunctive combination of requirements may be used to identify packets. For example, an enhanced flow description might specify that packets of type TCP and having an incoming port of 80 or 443 should be associated with a particular intra-application flow. A plurality of enhanced flow descriptions may be evaluated to determine if the packet is associated with any of a plurality of intra-application flows. In some embodiments, packets may be associated with a default flow if they do not match the criteria of any of the enhanced flow descriptions.

Packets may be scheduled 510 based on the granted and/or requested FPI. Each intra-application flow as defined by an enhanced flow description may be associated with an FPI. So, the FPI for a packet may be determined based on the intra-application flow identified 508 based on the enhanced flow description. A default FPI may be used for packets associated with a default flow (e.g., packets that could not be associated with any other intra-application flow). The default FPI may be received from the application function or determined locally. Scheduling 510 may include delaying and/or dropping packets. The application function may implement congestion control, so delaying and/or dropping packets may reduce the bandwidth used by the intra-application flow. Scheduling 510 may also or instead include marking packets based on the FPI. The marking may allow later recipients of the packets to schedule the packets according to the FPIs.

Figure 6:
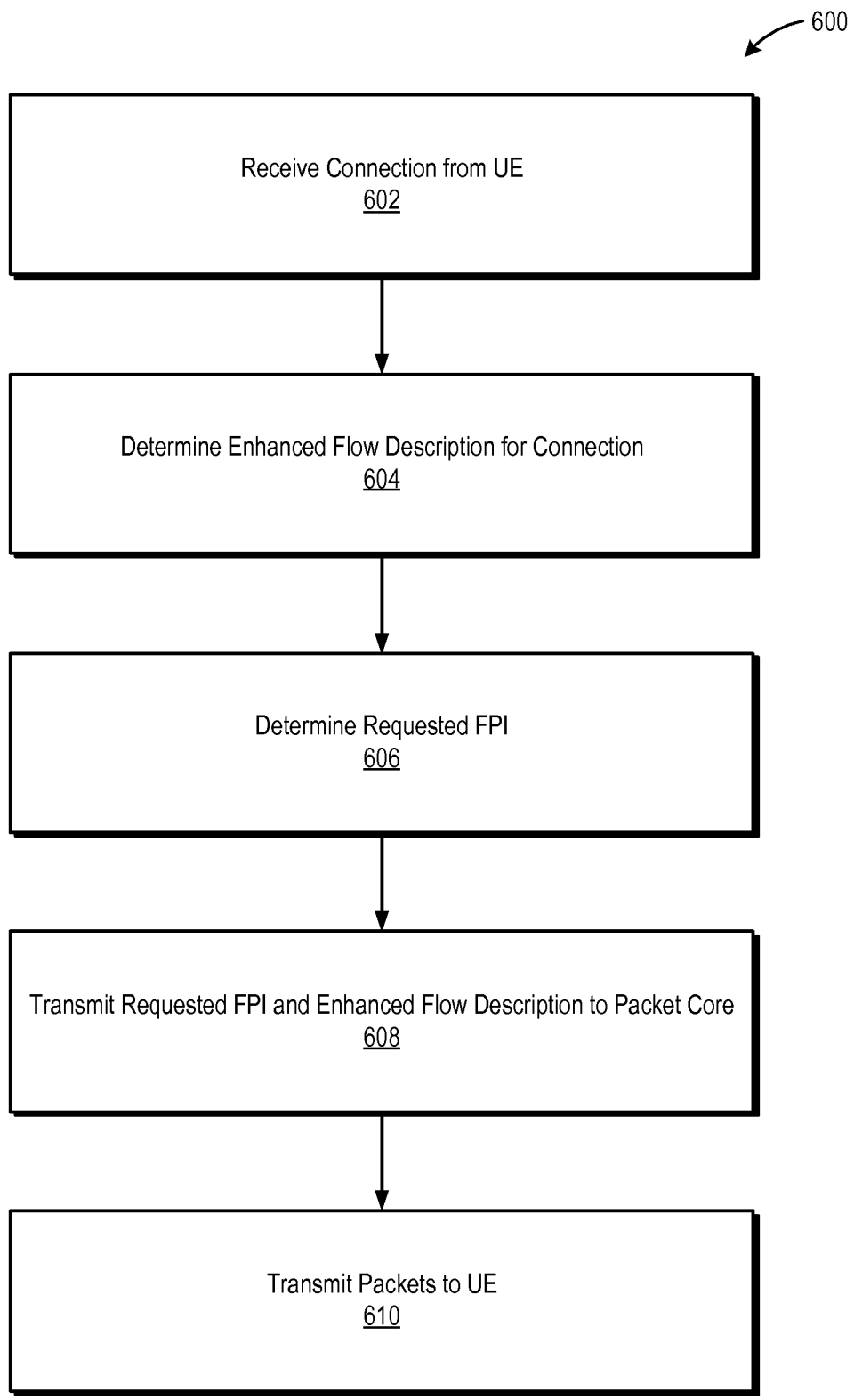
FIG. 6 is a flow diagram of a method for defining intra-application flows and corresponding FPIs.

FIG. 6 is a flow diagram of a method 600 for defining intra-application flows and corresponding FPIs. The method 600 may begin when a communicative coupling is received 602 from a mobile user device (e.g., a UE). A connection may be established, and it may be determined that scheduling based on intra-application FPI is supported. For example, the UE may indicate that it is a mobile device, and the capabilities of an EPC may be determined by communicating with a PCRF. The PCRF may indicate that it supports scheduling based on intra-application FPI.

One or more enhanced flow descriptions may be determined 604 for the connection. The kinds of packets that will be transmitted to the UE may be determined. Additionally, or instead, the number of intra-application flows that can and/or will be used may be calculated. Classification information that is able to distinguish the intra-application flow may be determined, and the enhanced flow description may be generated therefrom. In some configurations, the enhanced flow descriptions may be predetermined, and determining 604 may include loading the predetermined flow descriptions from a memory. The enhanced flow descriptions may also or instead be generated dynamically. In some configurations, the enhanced flow descriptions may be determined 604 based on the information received from the UE, for example, when receiving 602 the connection. The UE may indicate which types of data it would like to receive, and enhanced flow descriptions may be determined for those types of data. All packets that will be transmitted may be encompassed by an enhanced flow description, and/or it may be assumed or explicitly indicated that packets not encompassed by an enhanced flow description will be classified into a default category.

A requested FPI may be determined 606 for each intra-application flow that will be specified by an enhanced flow description. The requested FPI may be predetermined and determining 606 may include loading the predetermined FPI from a memory. Alternatively, or in addition, the requested FPI may be determined 606 based on information received from the UE. For example, the UE may indicate which types of data it would like to receive, and the relative priority of each type of data indicated may be determined. The UE may also, or instead, indicate which types of data are most important to it, and those types of data may be given the highest priority FPIs. For example, a user receiving streaming video may indicate that video is more important than audio or vice versa. A default FPI may also be determined for packets not encompassed by any of the enhanced flow descriptions.

The enhanced flow description and requested FPI for each intra-application flow may be transmitted 608 to the EPC (e.g., to the PCRF). The requested FPI and enhanced flow description may be transmitted via the Rx interface in an AA-request. The parameters for each intra-application flow may be included in their own AA-request, or a single AA-request may include all the enhanced flow descriptions and requested FPI. Packets may be transmitted 610 to the UE via the EPC. Transmission of the packets may start after the enhanced flow description and requested FPI are transmitted 608 to the EPC, after an acknowledgement of receipt is received from the EPC, and/or while the enhanced flow description and/or requested FPI are still being determined 604, 606. The transmitted packets may be classified into the intra-application flows and scheduled by the EPC once the enhanced flow description and requested FPI have been received and processed by the EPC.

Figure 7:
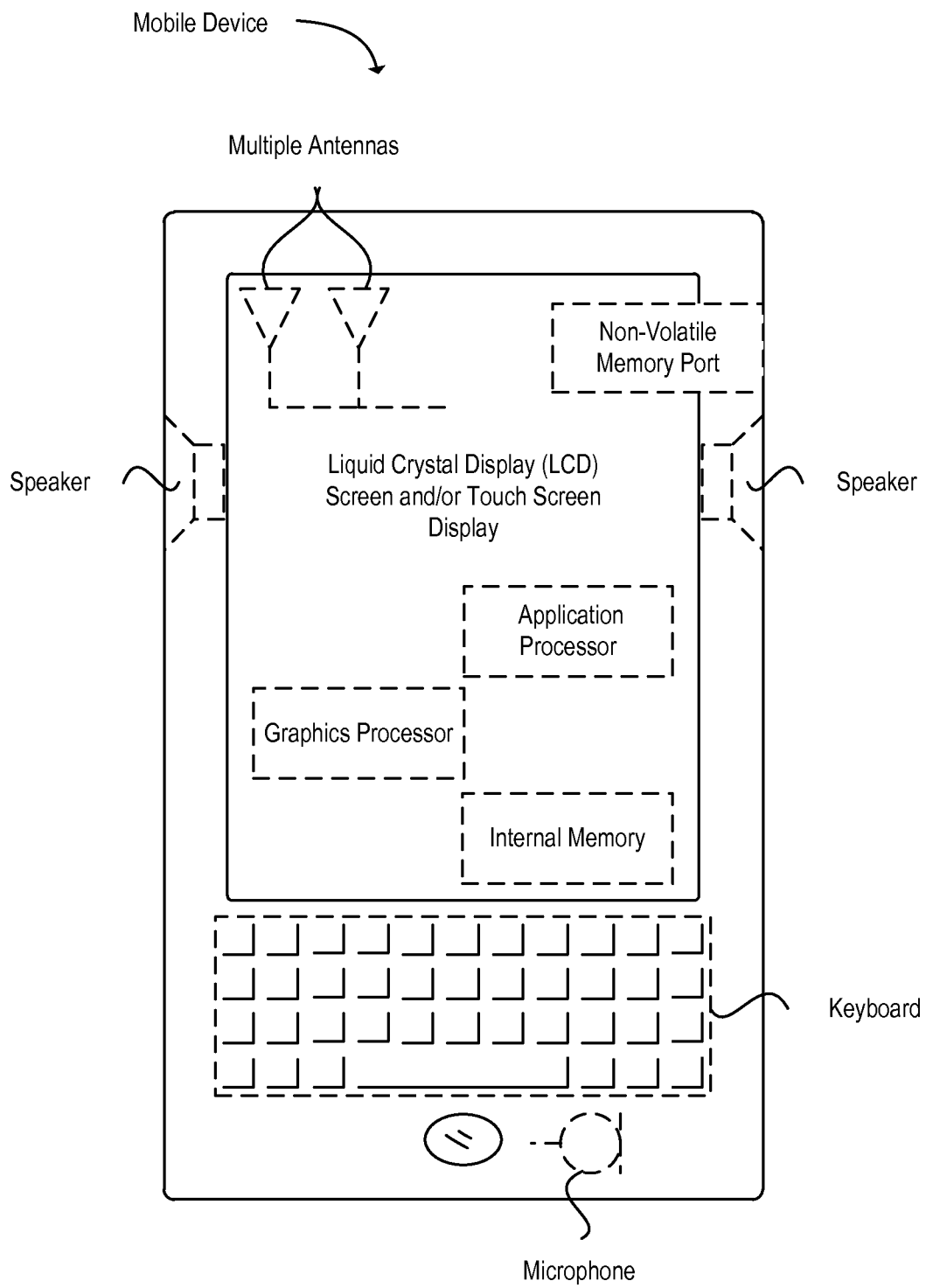
FIG. 7 is a schematic diagram of a UE able to compatible with scheduling based on intra-application FPI.

FIG. 7 is an example illustration of a mobile device, such as a user equipment (UE), a mobile station (MS), a mobile wireless device, a mobile communication device, a tablet, a handset, or another type of wireless communication device. The mobile device can include one or more antennas configured to communicate with a transmission station, such as a base station (BS), an eNB, a base band unit (BBU), a remote radio head (RRH), a remote radio equipment (RRE), a relay station (RS), a radio equipment (RE), or another type of wireless wide area network (WWAN) access point. The mobile device can be configured to communicate using at least one wireless communication standard, including 3GPP LTE, WiMAX, high speed packet access (HSPA), Bluetooth, and Wi-Fi. The mobile device can communicate using separate antennas for each wireless communication standard or shared antennas for multiple wireless communication standards. The mobile device can communicate in a wireless local area network (WLAN), a wireless personal area network (WPAN), and/or a WWAN.

FIG. 7 also provides an illustration of a microphone and one or more speakers that can be used for audio input and output from the mobile device. The display screen may be a liquid crystal display (LCD) screen or other type of display screen, such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the mobile device. A keyboard may be integrated with the mobile device or wirelessly connected to the mobile device to provide additional user input. A virtual keyboard may also be provided using the touch screen.

EXAMPLES

The following examples pertain to further embodiments:

Example 1 is a system within an EPC configured to transmit packets received from an application function to a UE. The system includes a processor. The processor is configured to receive a plurality of requests from the application function. Each request includes a requested FPI and an enhanced flow description. Each enhanced flow description identifies a distinct corresponding flow transmitted from the application function to the UE. The processor is also configured to prioritize flow traffic based on the plurality of requested FPIs.

In Example 2, at least one of the enhanced flow descriptions of Example 1 indicates a length of packets in the corresponding flow.

In Example 3, the at least one enhanced flow description of any of Examples 1-2 indicates a minimum length and a maximum length for the packets in the corresponding flow.

In Example 4, the length of any of Examples 1-3 is specified based on a modulo function.

In Example 5, at least one of the enhanced flow descriptions of any of Examples 1-4 indicates a value of a payload of packets in the corresponding flow.

In Example 6, the at least one enhanced flow description of any of Examples 1-5 indicates a position and a length of a field to be compared to the value.

In Example 7, the processor of any of Examples 1-6 is configured to determine a plurality of granted FPIs based on the plurality of requested FPIs.

In Example 8, each granted FPI of any of Examples 1-7 includes a number that indicates a priority relative to other FPIs.

Example 9 is a method for providing intra-application flow prioritization. The method includes receiving a request from a remote application. The request includes a flow priority and a flow description for a flow among a plurality of flows transmitted between the remote application and a user device. The method also includes identifying packets belonging to the flow based on the flow description. The method also includes scheduling the packets belonging to the flow based on the flow priority.

In Example 10, the flow description of Example 9 includes an indication of a packet length.

In Example 11, the indication of the packet length of any of Examples 9-10 is selected from the group consisting of a range and parameters of a modulo operation.

In Example 12, the flow description of any of Examples 9-11 includes an indication of a value of a packet field.

In Example 13, the flow description of any of Examples 9-12 includes an indication of a packet type.

In Example 14, the method of any of Examples 9-13 includes determining a granted priority based on the flow priority.

In Example 15, the identifying and scheduling of any of Examples 9-14 includes transmitting the granted priority and the flow description to a packet gateway. The packet gateway identifies the packets belonging to the flow and schedules the packets belonging to the flow based on the granted priority.

In Example 16, the granted priority of any of Examples 9-15 is determined based on the flow priority and packet inspection.

In Example 17, the flow of any of Examples 9-16 is a downlink flow carrying packets from the remote application to the user device.

Example 18 is a device for providing intra-application flow prioritization. The device includes circuitry. The circuitry is configured to determine a priority to be granted to each of a plurality of packet streams. The plurality of packet streams are from a single source. The circuitry is also configured to inspect packets to determine with which packet stream each packet is associated. The circuitry is also configured to mark each of the packets with the granted priority of the packet stream with which the packet is associated.

In Example 19, the circuitry of Example 18 determines with which packet stream each packet is associated based on classification information provided by a remote server.

In Example 20, the classification information of any of Examples 18-19 includes packet contents from which the associated packet stream for each packet can be determined.

In Example 21, the classification information of any of Examples 18-20 includes length characteristics from which the associated packet stream for each packet can be determined.

In Example 22, the circuitry of any of Examples 18-21 determines a default priority for packets not specified in the classification information.

In Example 23, the plurality of packet streams of any of Examples 18-22 include a video packet stream and an audio packet stream. The audio packet stream receives a higher determined priority than the video packet stream.

In Example 24, the circuitry of any of Examples 18-23 inspects and marks the packets by instructing a packet gateway to inspect and mark the packets.

Example 25 is a method for transmitting packets received from an application function to a UE. The method includes receiving a plurality of requests from the application function. Each request includes a requested FPI and an enhanced flow description. Each requested FPI and enhanced flow description is associated with a distinct corresponding flow transmitted from the application function to the UE. The method also includes identifying with which flow each of a plurality of packets is associated based on the enhanced flow description. The method also includes scheduling each packet based on the requested FPI associated with the identified flow.

In Example 26, the method of Example 25 includes determining a plurality of granted FPIs based on the plurality of requested FPIs.

In Example 27, the identifying and scheduling of any of Examples 25-26 includes transmitting the plurality of granted FPIs and the plurality of enhanced flow descriptions to a packet gateway. The packet gateway identifies the flow with which each packet is associated and schedules each packet based on the granted FPI.

In Example 28, the plurality of granted FPIs of any of Examples 25-27 are determined based on the plurality of requested FPIs and packet inspection.

In Example 29, each granted FPI of any of Examples 25-28 includes a number that indicates a priority relative to other FPIs.

In Example 30, at least one of the plurality of enhanced flow descriptions of any of Examples 25-29 indicates a length of packets in the associated flow.

In Example 31, the at least one enhanced flow description of any of Examples 25-30 indicates a range for the length of the packets in the associated flow. The range includes a minimum length and a maximum length.

In Example 32, the length of any of Examples 25-31 is specified based on a modulo function.

In Example 33, at least one of the plurality of enhanced flow descriptions of any of Examples 25-32 indicates a value of a payload of packets in the associated flow.

In Example 34, the at least one enhanced flow description of any of Examples 25-33 indicates a position and a length of a field to be compared to the value.

In Example 35, at least one of the plurality of enhanced flow descriptions of any of Examples 25-34 includes an indication of a packet type.

In Example 36, each flow of any of Examples 25-35 is a downlink flow carrying packets from the application function to the user device.

In Example 37, the plurality of flows of any of Examples 25-36 include a video packet flow and an audio packet flow. The audio packet flow receives a higher priority FPI than the video packet flow.

Example 38 is an apparatus including means to perform a method as described in any preceding example.

Example 39 is a machine readable storage including machine-readable instructions, which when executed, implement a method or realize an apparatus as described in any preceding example.

Various techniques, or certain aspects or portions thereof, may take the form of program code (i.e., instructions) embodied in tangible media, such as floppy diskettes, CD-ROMs, hard drives, a non-transitory computer readable storage medium, or any other machine-readable storage medium, wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, an EPROM, a flash drive, an optical drive, a magnetic hard drive, or another medium for storing electronic data. The eNB (or other base station) and UE (or other mobile station) may also include a transceiver component, a counter component, a processing component, and/or a clock component or timer component. One or more programs that may implement or utilize the various techniques described herein may use an application programming interface (API), reusable controls, and the like. Such programs may be implemented in a high-level procedural or an object-oriented programming language to communicate with a computer system. However, the program(s) may be implemented in assembly or machine language, if desired. In any case, the language may be a compiled or interpreted language, and combined with hardware implementations.

It should be understood that many of the functional units described in this specification may be implemented as one or more components, which is a term used to more particularly emphasize their implementation independence. For example, a component may be implemented as a hardware circuit comprising custom very large scale integration (VLSI) circuits or gate arrays, off-the-shelf semiconductors such as logic chips, transistors, or other discrete components. A component may also be implemented in programmable hardware devices such as field programmable gate arrays, programmable array logic, programmable logic devices, or the like.

Components may also be implemented in software for execution by various types of processors. An identified component of executable code may, for instance, comprise one or more physical or logical blocks of computer instructions, which may, for instance, be organized as an object, a procedure, or a function. Nevertheless, the executables of an identified component need not be physically located together, but may comprise disparate instructions stored in different locations that, when joined logically together, comprise the component and achieve the stated purpose for the component.

Indeed, a component of executable code may be a single instruction, or many instructions, and may even be distributed over several different code segments, among different programs, and across several memory devices. Similarly, operational data may be identified and illustrated herein within components, and may be embodied in any suitable form and organized within any suitable type of data structure. The operational data may be collected as a single data set, or may be distributed over different locations including over different storage devices, and may exist, at least partially, merely as electronic signals on a system or network. The components may be passive or active, including agents operable to perform desired functions.

Reference throughout this specification to "an example" means that a particular feature, structure, or characteristic described in connection with the example is included in at least one embodiment of the present disclosure. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples of the present disclosure may be referred to herein along with alternatives for the various components thereof. It is understood that such embodiments, examples, and alternatives are not to be construed as de facto equivalents of one another, but are to be considered as separate and autonomous representations of the present disclosure.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the disclosure is not to be limited to the details given herein, but may be modified within the scope and equivalents of the appended claims.

Those having skill in the art will appreciate that many changes may be made to the details of the above-described embodiments without departing from the underlying principles of the disclosure. The scope of the present application should, therefore, be determined only by the following claims.

The invention claimed is:

1. A system for intra-application flow prioritization, the system comprising:
a processor configured to:
receive, at a policy and charging rules function (PCRF), a plurality of requests from an application function, each request including a requested intra-application flow priority indicator (FPI) and an enhanced flow description for an intra-application flow within an application flow, wherein each enhanced flow description identifies the corresponding intra-application flow;
determine, by the PCRF, a plurality of granted intra-application FPIs based on the plurality of requested intra-application FPIs; and
provide, by the PCRF, at least one of the granted intra-application FPIs to a policy and charging enforcement function (PCEF) for identifying, by the PCEF, packets belonging to the intra-application flow based on the flow description and scheduling, by the PCEF, the packets belonging to the intra-application flow based on the intra-application FPI.

2. The system of claim 1, wherein at least one of the enhanced flow descriptions indicates a length of packets in the corresponding intra-application flow.

3. The system of claim 2, wherein the at least one enhanced flow description indicates a minimum length and a maximum length for the packets in the corresponding intra-application flow.

4. The system of claim 2, wherein the length is specified based on a modulo function.

5. The system of claim 1, wherein at least one of the enhanced flow descriptions indicates a value of a payload of packets in the corresponding intra-application flow.

6. The system of claim 5, wherein the at least one enhanced flow description indicates a position and a length of a field to be compared to the value.

7. The system of claim 1, wherein each granted FPI includes a number that indicates a priority relative to other FPIs.

8. A method for providing intra-application flow prioritization, the method comprising:
receiving, at a policy and charging enforcement function (PCEF), a request from a policy and charging rules function (PCRF), the request including an intra-application flow priority indicator (FPI) and a flow description for an intra-application flow among a plurality of intra-application flows within an application flow between an evolved packet core (EPC) and a user device, wherein the PCRF received a plurality of requests from an application function, each request including a requested intra-application FPI and an enhanced flow description for an intra-application flow within an application flow, wherein each enhanced flow description identifies the corresponding intra-application flow and determined a plurality of granted intra-application FPIs based on the plurality of requested intra-application FPIs;
identifying, by the PCEF, packets belonging to the intra-application flow based on the flow description; and
scheduling, by the PCEF, the packets belonging to the intra-application flow based on the intra-application FPI.

9. The method of claim 8, wherein the flow description comprises an indication of a packet length.

10. The method of claim 9, wherein the indication of the packet length is selected from the group consisting of a range and parameters of a modulo operation.

11. The method of claim 8, wherein the flow description comprises an indication of a value of a packet field.

12. The method of claim 8, wherein the flow description comprises an indication of a packet type.

13. The method of claim 8, further comprising determining a granted priority based on the intra-application FPI.

14. The method of claim 13, wherein identifying and scheduling comprises transmitting the granted priority and the flow description to a packet gateway, and wherein the packet gateway identifies the packets belonging to the flow and schedules the packets belonging to the flow based on the granted priority.

15. The method of claim 13, wherein the granted priority is determined based on the intra-application FPI and packet inspection.

16. The method of claim 8, wherein the flow is a downlink flow carrying packets from a remote application to the user device.

17. A device for providing intra-application flow prioritization, the device comprising:
circuitry configured to:
determine, by a policy and charging enforcement function (PCEF), an intra-application flow priority indicator (FPI) to be granted to each of a plurality of intra-application packet streams, wherein the plurality of intra-application packet streams are from a single application, wherein the PCEF receives the intra-application flow priority indicator (FPI) and a flow description for an intra-application flow from the policy and charging rules function (PCRF) as requested by an application function;
inspect, by the PCEF, packets to determine with which intra-application packet stream each packet is associated; and
mark, by the PCEF, each of the packets with a granted priority of the intra-application packet stream with which the packet is associated.

18. The device of claim 17, wherein the circuitry determines with which intra-application packet stream each packet is associated based on classification information provided by a remote server.

19. The device of claim 18, wherein the classification information includes packet contents from which the associated packet stream for each packet can be determined.

20. The device of claim 18, wherein the classification information includes length characteristics from which the associated packet stream for each packet can be determined.

21. The device of claim 18, wherein the circuitry determines a default priority for packets not specified in the classification information.

22. The device of claim 17, wherein the plurality of intra-application packet streams include a video packet stream and an audio packet stream, and wherein the audio packet stream receives a higher determined priority than the video packet stream.

23. The device of claim 17, wherein the circuitry inspects and marks the packets by instructing a packet gateway to inspect and mark the packets.

\* \* \* \* \*